United States Patent
Fukumura et al.

(10) Patent No.: US 7,127,369 B2
(45) Date of Patent: Oct. 24, 2006

(54) SENSOR ASSEMBLY

(75) Inventors: Tomohiro Fukumura, Rochester Hills, MI (US); Sanjaya Kumar Dash, Rochester Hills, MI (US)

(73) Assignee: Siemens VDO Automotive Corporation, Auburn Hills ( * ) Notice: Subject to any disclaimer, the term of this patent is extended or adjusted under 35 U.S.C. 154(b) by 378 days.

(21) Appl. No.: 10/267,534

(22) Filed: Oct. 9, 2002

(65) Prior Publication Data

US 2003/0074966 A1 Apr. 24, 2003

Related U.S. Application Data

(60) Provisional application No. 60/328,439, filed on Oct. 9, 2001.

(51) Int. Cl.
*G06F 15/00* (2006.01)

(52) U.S. Cl. ............... 702/150; 33/361; 318/685; 324/207.23; 340/435; 340/995.14

(58) Field of Classification Search ............... 702/96, 702/141–143, 145, 149–151, 190; 701/23, 701/36, 45, 96; 473/157; 356/28; 340/436, 340/442, 435, 995.14; 318/281, 282, 286, 318/432, 445, 615, 685; 303/5; 29/609; 33/361; 324/207.23; 342/359
See application file for complete search history.

(56) References Cited

U.S. PATENT DOCUMENTS

| | | | | |
|---|---|---|---|---|
| 4,413,424 A | * | 11/1983 | Sasaki et al. | 33/361 |
| 4,511,832 A | * | 4/1985 | Schmitz | 318/685 |
| 4,629,982 A | * | 12/1986 | Kieslich | 324/207.23 |
| 4,841,303 A | * | 6/1989 | Anderson | 342/359 |
| 5,020,903 A | * | 6/1991 | Sakai et al. | 356/28 |
| 5,434,487 A | * | 7/1995 | Long et al. | 318/286 |
| 5,471,736 A | * | 12/1995 | Griebeler | 29/609 |
| 5,594,414 A | * | 1/1997 | Namngani | 340/436 |
| 5,793,310 A | * | 8/1998 | Watanabe et al. | 340/995.14 |
| 6,278,363 B1 | * | 8/2001 | Bezek et al. | 340/442 |
| 6,281,786 B1 | * | 8/2001 | Adachi et al. | 340/435 |
| 6,313,742 B1 | * | 11/2001 | Larson | 340/442 |
| 6,411,873 B1 | * | 6/2002 | Rogovin | 701/36 |
| 6,667,591 B1 | * | 12/2003 | Mullet et al. | 318/445 |
| 2002/0167218 A1 | * | 11/2002 | Chubb | 303/5 |

* cited by examiner

*Primary Examiner*—Bryan Bui
*Assistant Examiner*—John Le

(57) ABSTRACT

A system with a sensor assembly is used to determine direction of movement of an object so that accuracy of position calculation is improved. The sensor assembly measures at least two operational characteristics and generates corresponding operational characteristic signals. A control unit monitors and compares transitions of the signals to more accurately determine direction of movement for the object.

25 Claims, 1 Drawing Sheet

SENSOR ASSEMBLY

CROSS-REFERENCE TO RELATED APPLICATIONS

The application claims priority to U.S. Provisional Application No. 60/328,439, which was filed on Oct. 9, 2001.

BACKGROUND OF THE INVENTION

This invention relates to a system that monitors two sensor signals to determine direction of movement of an object so that position of the object can be more accurately determined.

Many different types of control systems monitor various characteristics of an object in order to make control decisions. For example, sensors can monitor and generate data that can be used to determine speed, position, and/or direction of movement of the object. Direction is determined by comparing two sensor signals to each other and position is incremented or decremented according to the direction. A system micro controller calculates position. It is important that a determination of direction of movement be accurate so that position can be accurately determined. Misjudgments of the direction can result in error in position calculation.

Misjudgments can occur either by a signal phase shift or by noise. The phase shift is caused by imbalance between the two sensors and/or imbalance between the interface circuits for the sensors. Noise can also cause misjudgments. For example, if the first sensor turns high from low due to noise when a rising edge of the second sensor is received, the direction of movement can be misjudged.

Thus, it is desirable to have a system that can more accurately determine direction of movement of an object to increase accuracy of position determination.

SUMMARY OF THE INVENTION

In general terms, this invention monitors signal transitions to verify whether or not direction of movement of a moving object has been accurately determined to improve the accuracy of position calculation.

An example method and system designed according to this invention includes a sensor assembly that measures at least two operational characteristics. The sensor assembly generates first and second operational characteristic signals. A control unit compares transitions of the signals and the direction of movement is determined based on these transitions. The signals are continuously monitored over time to determine changes in direction of movement. First direction is checked. If a new direction is indicated, which is different than the previous direction, current speed is compared to a threshold speed. If the current speed exceeds the threshold speed then the new direction is discarded as inaccurate data.

Optionally, first check speed and any changes in speed. If the speed is more than a threshold speed or increasing then there is no need to check direction as the same direction is assumed.

The subject system and method reduces data misinterpretations caused by noise or intermittent phase shifts between a pair of operational characteristic signals to produce a more accurate direction determination, which in turn provides increased accuracy in position calculation. These and other features of the present invention can be best understood from the following specifications and drawings, the following of which is a brief description.

DETAILED DESCRIPTION OF A PREFERRED EMBODIMENT

Figure 1:
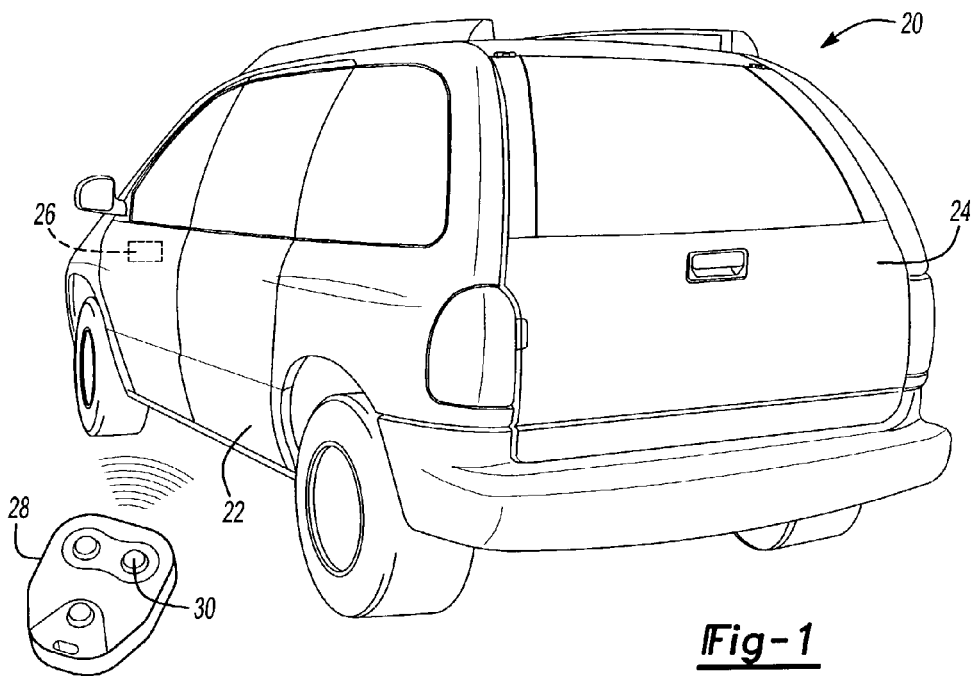
FIG. 1 schematically illustrates a vehicle having moveable panels that are controlled by a system designed according to this invention.

While the subject invention can be used in any of various types of control systems to improve accuracy of position calculation of a moving object, the following description uses vehicle door closure systems as an example. FIG. 1 schematically illustrates a vehicle 20 having a moveable door panel 22 and a moveable lift gate 24. The vehicle 20 is provided with a system designed according to this invention for automatically moving the door 22 or lift gate 24 with a power closure arrangement that operates as generally known in the art.

The illustrated example vehicle includes a switch 26 supported within a vehicle for selectively activating the power closure system to close the door 22 or lift gate 24. The illustrated example also includes a remote signaling device 28 such as a key fob having at least one switch 30 that an individual can use to selectively activate the power closure system.

Any system such as power window, wheel sensor for ABS, and steering wheel sensor, which uses a pair of "relative" sensors to determine speed, position, and direction, can incorporate features of the subject invention.

Figure 2:
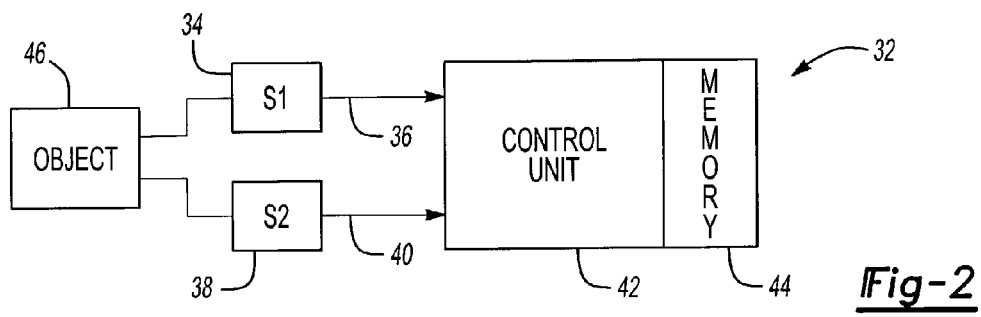
FIG. 2 schematically illustrates a sensor and control system incorporating the subject invention.
Figure 3:
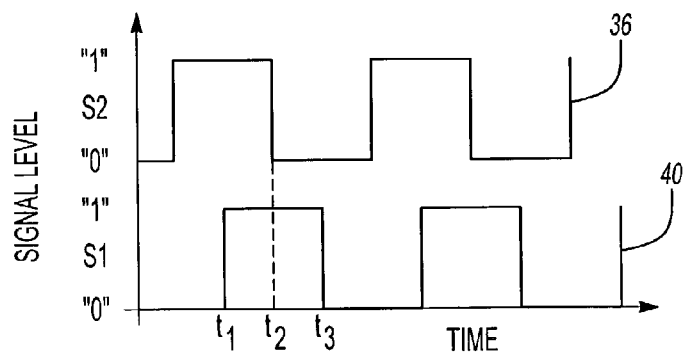
FIG. 3 is a Signal Level vs. Time graph for a pair of sensors operating correctly.

FIG. 2 shows a schematic illustration of a "relative" sensor and control assembly 32 that is used to determine vehicle door speed, position, and direction for the door 22 or lift gate 24 as the door 22 or lift gate 24 moves between open and closed positions. Examples of the "relative" sensor are encoder and Hall Effect sensors. These sensors include a pair of sensors 34, 38, which read either an optical (in case of encoder) or a magnetic (in case of Hall Effect sensor) signal from the same ring. The output of the sensors 34, 38 is square wave as shown in FIG. 3, whose frequency changes proportionally to the rotational speed of the ring. The two sensors 34, 38 essentially output the same signal 36, 40 because both read the same ring, but output at a slightly different timing because they are placed separately. Thus one signal 36 leads the other signal 40 in one direction and follows in the other direction as shown in FIG. 3. This is how the direction is determined as will be explained in greater detail below.

It should be understood that the sensors 34, 38 could be any type of contact or non-contact sensors known in the art. Further, while the sensors 34, 38 are shown as separate sensors, it should be understood that a single sensor assembly could also be used to generate both the first signal 36 and the second signal 40. Finally, while a door closure system is shown in FIG. 1, it should be understood that the sensors 34, 38 could be associated with any type of object 46 including, but not limited to, a vehicle wheel, steering wheel, and power window.

Direction is determined by comparing the two sensor signals to each other and position is incremented or decremented according to the direction. A system micro controller calculates position. It is important that a determination of direction of movement be accurate so that position can be accurately determined. Misjudgments of the direction can result in error in position calculation. Misjudgments can occur either by a signal phase shift or by noise.

For example, the order of sensor S1 and S2 might be opposite, causing misjudgment of direction. The phase shift is caused by imbalance between the two sensors S1 and S2 and the interface circuits the sensors S1 and S2 thus gets worse as its frequency gets higher.

Misjudgment can also be a result of noise. For example, if one sensor S1 turns high from low due to noise when rising edge of the other sensor S2 is received, the direction is misjudged as open.

The signals 36, 40 are transmitted to a control unit 42 with memory 44 that calculates the speed, the direction, and the position of the door 22 or lift gate 24 by comparing the data from the signals 36, 40. It should be understood that any type of control unit 42 known in the art could be used including a central processing unit, a microprocessor, or other similar device.

The control unit 42 continuously monitors and compares the signals 36, 40 and their respective transitions as the door 22 or lift gate 24 moves between open and closed positions. For every transition of one sensor 34, either rising or falling, the other sensor 38 will transition before the first sensor 34 transitions again. In other words, if one signal 36 transitions, as indicated at t1 in FIG. 3, the other signal 40 will also correspondingly transition, as indicated at t2, and will do so prior to the first signal 36 being able to make a subsequent transition, as shown at t3. If the sensor assembly is operating correctly, the signals 36, 40 will track each other as shown in FIG. 3.

As FIG. 3 shows, direction is judged in the following way. For a situation where a rising edge of sensor S2 is received by the control unit 42 there are generally two possibilities. If sensor S1 is low, then sensor S2 is leading thus the door is closing, or if sensor S1 is high, then sensor S2 is following thus the door is opening. It should be understood that the opposite orientation could also be used, i.e. if sensor S1 is low then sensor S2 is leading thus the door is opening, while if sensor S1 is high, then sensor S2 is following thus the door is closing.

For a situation where a falling edge of sensor S2 is received by the control unit 42 there are also generally two possibilities. If sensor S1 is low, then sensor S2 is following thus the door is opening, or if sensor S1 is high, then sensor S2 is leading thus the door is closing. It should be understood that the opposite orientation could also be used, i.e. if sensor S1 is low then sensor S2 is following thus the door is closing, while if sensor S1 is high, then sensor S2 is leading thus the door is opening.

Position is incremented or decremented depending on the direction every time an edge (rising or falling) is detected. For example, if the direction is judged as opening, position is incremented. If the direction is judged as closing, then position is decremented. If the direction is misjudged as opening, for example, when the door is actually closing, position gets incremented instead of decremented, resulting in error in position calculation.

Having the correct data is critical to determining an accurate door direction. If there is an intermittent phase shift between the signals 36 and 40, the data may be misinterpreted and inaccuracies in door direction can lead to a wrong direction fault warning or error signal within the system. The subject invention addresses this problem by monitoring the transitions along with door speed to determine direction of movement to more accurately be able to determine position.

By monitoring and comparing signal transitions of the signals 36 and 40, an initial direction of vehicle door movement is determined. This initial direction of vehicle door movement is stored in memory 44 as a direction history. The size of the direction history can be byte, word, or any size that is sufficient for making a sound judgment. The system continues to monitor and compare signal transitions of the signals 36 and 40 to determine changes in direction of vehicle door movement. Current door speed is compared to a threshold speed in response to receiving an indication of a new direction of vehicle door movement that is different than the direction previously stored as the direction history. If the threshold speed is exceeded then the new direction is discarded as inaccurate data. Position is incremented or decremented based on the direction determination discussed above.

For example, when a new direction is received, the direction history byte is shifted to the left and the new direction is stored as a least significant bit (LSB) or shifted to the right and the new direction is stored as a most significant bit (MSB). If the new direction does not match the initial or previous direction, and the door speed is greater than the threshold speed, the new direction is discarded. The new direction is determined to be inaccurate data because the system cannot change the direction abruptly if it is moving greater than the threshold speed. Thus, if the new direction is different than the previous direction and the door speed is less than or equal to the threshold speed, then the new direction is determined to be valid. It should be understood that the threshold speed can be any predetermined speed and could vary based on vehicle type and application.

The subject invention addresses these problems by using the fact that speed gradually reduces to zero and then gradually increases when the direction changes in combination with the following rules. When speed is more than the predetermined threshold or is increasing, direction cannot change and can be assumed to be unchanged. Prior to making a final decision, the control unit 42 reviews the history of direction and if the history is consistent, i.e. all of the history shows the same direction, then the control unit 42 decides on the same direction without actually checking the direction. If the history is not consistent, then the history cannot be relied on and the direction should be checked. On the other hand, when speed is less than the predetermined threshold and decreasing, direction may change, thus the direction is checked.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for determining a direction in which an object is moving comprising the steps of:
   (a) generating a first signal representing a first operational characteristic;
   (b) generating a second signal representing a second operational characteristic wherein the first operational characteristic is the same as the second operational characteristic, and wherein steps (a) and (b) include generating the first and second signals with different timing relative to each other;
   (c) comparing the first and second signals to determine an initial direction; and
   (d) monitoring transitions of the first and second signals over time to verify that the initial direction is accurate and conveying the initial direction to a control unit for use in determining a position of the object.

2. A method as set forth in claim 1 including the step of comparing an object speed to a predetermined threshold speed during step (d) to determine whether the initial direction is accurate.

3. A method as set forth in claim 1 wherein step (c) further includes comparing transitions of the first and second signals over time to determine the initial direction and storing the initial direction in memory as a direction history.

4. A method as set forth in claim 1 wherein the moving object comprises a door panel.

5. A method as set forth in claim 1 wherein the moving object comprises a power window.

6. A method as set forth in claim 1 wherein the moving object comprises a vehicle wheel.

7. A method as set forth in claim 1 wherein the moving object comprises a steering wheel.

8. A method as set forth in claim 1 wherein the first and second signals each have a similar signal shape including a plurality of transitions, and wherein step (c) includes directly comparing at least one transition of the first signal to at least one transition of the second signal to determine the initial direction.

9. A method for determining a direction in which an object is moving comprising the steps of:
   (a) generating a first signal representing a first operational characteristic;
   (b) generating a second signal representing a second operational characteristic;
   (c) comparing the first and second signals to determine an initial direction including comparing transitions of the first and second signals over time to determine the initial direction and storing the initial direction in memory as a direction history; and
   (d) monitoring transitions of the first and second signals over time to verify that the initial direction is accurate, subsequently checking direction to generate a new direction, comparing the new direction to the initial direction, and checking speed if the new direction is different than the initial direction.

10. A method as set forth in claim 9 further including the step of discarding the new direction if the speed is more than a predetermined threshold speed or speed is increasing.

11. A method for determining a direction in which an object is moving comprising the steps of:
   (a) generating a first signal representing a first operational characteristic;
   (b) generating a second signal representing a second operational characteristic;
   (c) comparing the first and second signals to determine an initial direction;
   (d) monitoring transitions of the first and second signals over time to verify that the initial direction is accurate and conveying the initial direction to a control unit for use in determining a position of the object; and
   (e) measuring speed and changes in speed, comparing speed to a predetermined threshold speed, and only checking direction if the speed is less than the predetermined threshold speed.

12. A method as set forth in claim 11 including the step of assuming no direction change if the speed is more than the predetermined threshold speed or is increasing.

13. A method for determining a direction in which an object is moving comprising the steps of:
   (a) generating a first signal representing a first operational characteristic;
   (b) generating a second signal representing a second operational characteristic;
   (c) comparing the first and second signals to determine an initial direction;
   (d) monitoring transitions of the first and second signals over time to verify that the initial direction is accurate and conveying the initial direction to a control unit for use in determining a position of the object; and
   (e) measuring speed and changes in speed, comparing speed to a predetermined threshold speed, and only checking direction if the speed is decreasing.

14. A method for determining a direction in which an object is moving comprising the steps of:
   (a) generating a first signal representing a first operational characteristic;
   (b) generating a second signal representing a second operational characteristic;
   (c) comparing the first and second signals to determine an initial direction;
   (d) monitoring transitions of the first and second signals over time to verify that the initial direction is accurate and conveying the initial direction to a control unit for use in determining a position of the object; and
   (e) measuring speed and changes in speed, comparing speed to a predetermined threshold speed, and only checking direction if the speed is decreasing and is less than the predetermined threshold speed.

15. A system for verifying direction of movement of an object in response to an intermittent sensor phase shift comprising:
   a sensor assembly for measuring at least first and second object operational characteristics as said object moves to generate first and second object operational characteristic signals; and
   a control unit for comparing signal transitions of said first and second object operational characteristic signals to determine an initial direction of object movement and continuing to compare signal transitions of said first and second object operational characteristic signals over time to verify accuracy of initial direction determination, said control unit using the initial direction determination to determine a position of the object, wherein said control unit assumes no direction change if speed is more than a predetermined threshold speed or is increasing.

16. A system as set forth in claim 15 wherein said control unit only checks direction if speed is decreasing.

17. A system as set forth in claim 15 wherein said object comprises a vehicle door controlled by a power closure system.

18. A system as set forth in claim 15 wherein said object comprises a steering wheel.

19. A system as set forth in claim 15 wherein said object comprises a power window.

20. A system as set forth in claim 15 wherein said object comprises a vehicle wheel and said sensor assembly comprises an ABS wheel sensor.

21. A system for verifying direction of movement of an object in response to an intermittent sensor phase shift comprising:
   a sensor assembly for measuring at least first and second object operational characteristics as said object moves to generate first and second object operational characteristic signals; and
   a control unit for comparing signal transitions of said first and second object operational characteristic signals to determine an initial direction of object movement and continuing to compare signal transitions of said first and second object operational characteristic signals over time to verify accuracy of initial direction determination wherein said control unit subsequently checks direction to generate a new direction, compares the new direction to said initial direction, checks speed if the new direction is different than said initial direction, and discards the new direction if the speed is more than a predetermined threshold speed, wherein said control unit uses at least one of the initial direction and the new direction to determine a position of the object.

22. A system for verifying direction of movement of an object in response to an intermittent sensor phase shift comprising:
   a sensor assembly for measuring at least first and second object operational characteristics as said object moves to generate first and second object operational characteristic signals; and
   a control unit for comparing signal transitions of said first and second object operational characteristic signals to determine an initial direction of object movement and continuing to compare signal transitions of said first and second object operational characteristic signals over time to verify accuracy of initial direction determination, said control unit using the initial direction determination to determine a position of the object, wherein said control unit only checks direction if speed is less than a predetermined threshold speed.

23. A system for verifying direction of movement of an object in response to an intermittent sensor phase shift comprising:
   a sensor assembly for measuring at least first and second object operational characteristics as said object moves to generate first and second object operational characteristic signals; and
   a control unit for comparing signal transitions of said first and second object operational characteristic signals to determine an initial direction of object movement and continuing to compare signal transitions of said first and second object operational characteristic signals over time to verify accuracy of initial direction determination, said control unit using the initial direction determination to determine a position of the object, wherein said control unit only checks direction if speed is decreasing and less than a predetermined threshold speed.

24. A system for verifying direction of movement of an object in response to an intermittent sensor phase shift comprising:
   a sensor assembly for measuring at least first and second object operational characteristics as said object moves to generate first and second object operational characteristic signals; and
   a control unit for comparing signal transitions of said first and second object operational characteristic signals to determine an initial direction of object movement and continuing to compare signal transitions of said first and second object operational characteristic signals over time to verify accuracy of initial direction determination, said control unit using the initial direction determination to determine a position of the object, wherein the first object operational characteristic is the same as the second object operation characteristic and wherein the first and second object operational characteristic signals are output with different timing relative to each other.

25. A system as set forth in claim 24 wherein the first and second object operational characteristic signals each have a similar signal shape including a plurality of signal transitions, and wherein said control unit directly compares at least one signal transition of the first object operational characteristic signal to at least one signal transition of the second object operational characteristic signal to determine the initial direction of object movement.

* * * * *